E. C. BOHLMANN.
POWER TRANSMISSION.
APPLICATION FILED JUNE 2, 1917.

1,254,468.

Patented Jan. 22, 1918.
2 SHEETS—SHEET 1.

Eduard C. Bohlmann
Inventor

By Geo. P. Kimmel.
Attorney

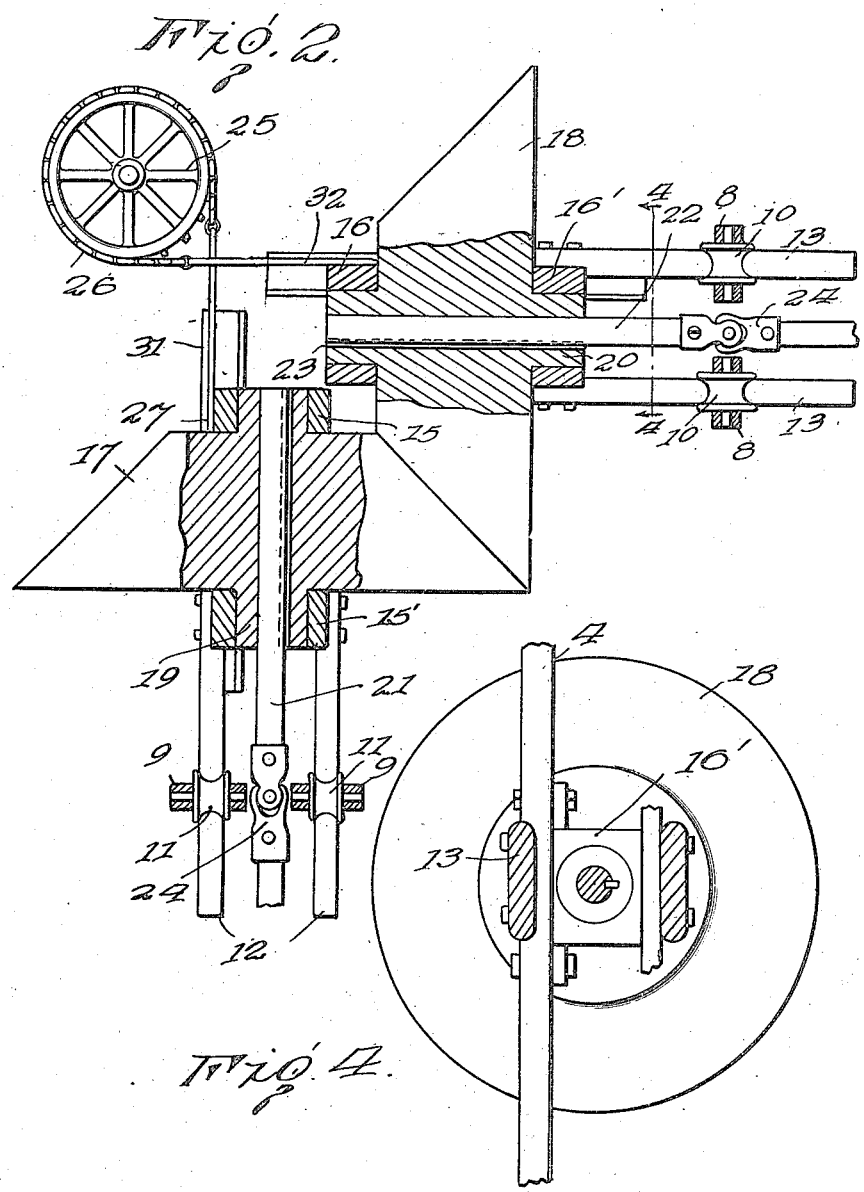

UNITED STATES PATENT OFFICE.

EDUARD C. BOHLMANN, OF ADELL, WISCONSIN.

POWER TRANSMISSION.

1,254,468.     Specification of Letters Patent.     Patented Jan. 22, 1918.

Application filed June 2, 1917. Serial No. 172,512.

*To all whom it may concern:*

Be it known that I, EDUARD C. BOHLMANN, a subject of the Emperor of Germany, and resident of Adell, in the county of Sheboygan and State of Wisconsin, have invented certain new and useful Improvements in Power Transmissions, of which the following is a specification.

This invention relates to power transmission and has more especial reference to an improved variable speed transmission of the friction gear type.

The invention has for its dominant object to provide a power transmission apparatus whereby a plurality of different speed ratios can be established without the usual intricate arrangements of gearing and methods of shifting the same and allowing a plurality of different driving relations by means of a simple and effective operating means.

Another object of the invention is to provide a novel mounting for the friction gearing of the power transmitting means in order that the same may be shifted with relation to each other to establish the desired speed ratio.

Among other aims and objects of the invention may be recited, the provision of gearing of the character mentioned, with a view to compactness, and in which the number of parts are few, the construction simple, the cost of production small, and efficiency and operation high.

Other independent objects are to provide features of construction in proportion of the gearing which tend for the attainment of the above aims irrespective of the relation in which they are used.

Other objects will be in part obvious and in part pointed out hereinafter.

The invention accordingly consists of the features of construction, combinations of elements and arrangements of parts which will be exemplified in the construction hereinafter set forth, and the scope of the application of which will be indicated in the following claims.

In the accompanying drawings wherein is shown one of the various possible embodiments of my invention:

Fig. 2 is a top plan thereof with parts broken away and shown in section;

Fig. 4 is a section taken on the line 4—4 of Fig. 2.

Similar reference characters refer to similar parts throughout the several views of the drawings.

Figure 1:
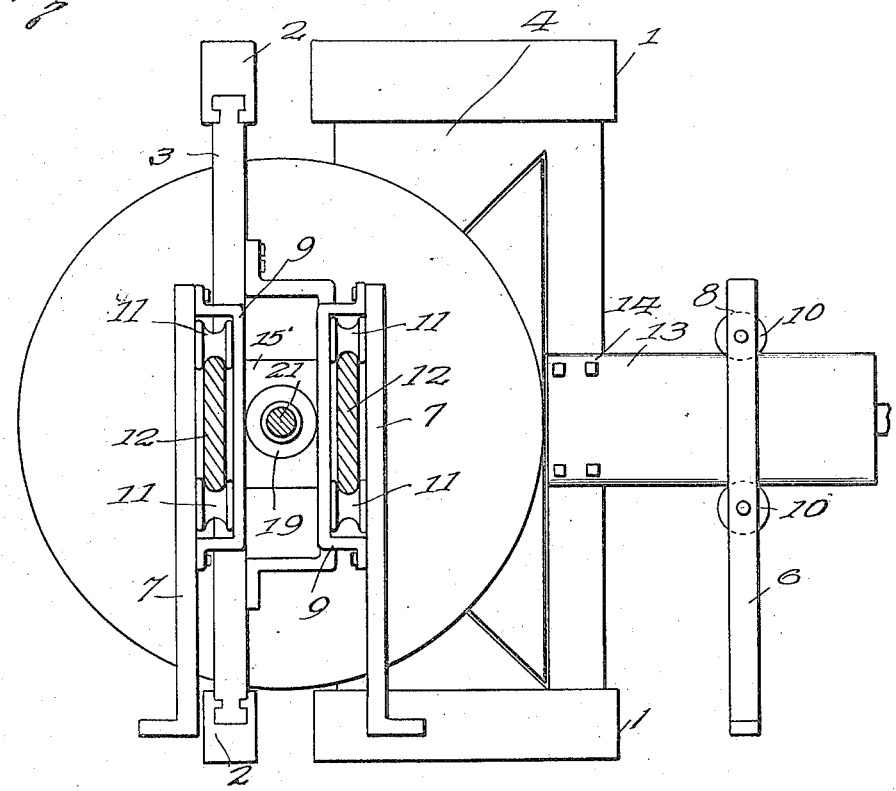
Figure 1 is a vertical transverse section through the gearing of the transmission.
Figure 3:
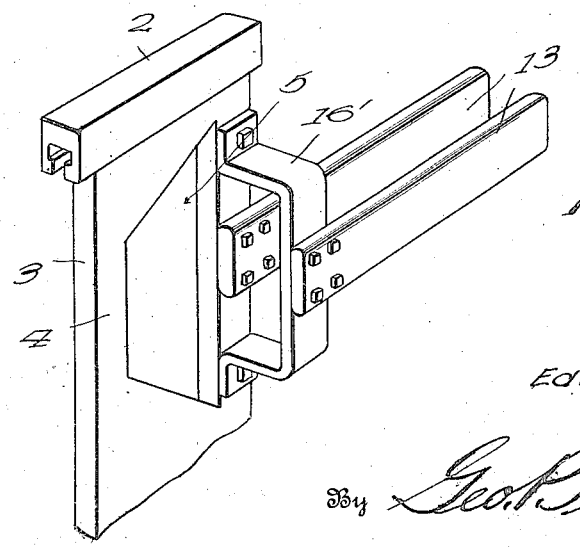
Fig. 3 is a fragmentary detail in perspective of the mounting of one of the friction gears.

Having more especial reference to the present improvement 1 and 2 designate alined pairs of grooved guides, which guides are arranged upon a suitable bed, not shown, and serve as means for slidably receiving bed plates 3 and 4, the upper and lower ends of which are formed complementally to the said grooved guides 1 and 2 and are provided with recessed portions 5 corresponding in shape to the beveled friction gears hereinafter more fully described. Standards 6 and 7 are arranged upon the bed adjacent the various guides and have secured to their upper ends brackets 8 and 9 in which rollers 10 and 11 are journaled, it being noted in this connection, that the said rollers are arranged adjacent the upper and lower ends of the brackets. Laterally extending pairs of arms 12 and 13 are bolted to the rear sides of each of the slidable bed plates 3 and 4 as at 14 and are received between the upper and lower rollers 10 and 11 journaled in the brackets 8 and 9, thereby preventing binding of the same in their respective grooved guides 1 and 2.

Bearings 15, 15′, and 16 and 16′ are arranged upon the forward and rear sides of the slidable bed plates 3 and 4 and serve as means for rotatably supporting beveled friction gears 17 and 18, these gears having trunnions 19 and 20 formed upon their respective extremities.

Driving and driven shafts 21 and 22 respectively are provided and have the beveled friction gears 17 and 18 splined thereto as at 23; the said driving and driven shafts being formed in sections which are connected by ordinary universal joints 24 in order that relative shifting of the friction gears 17 and 18 will be permitted.

A sprocket wheel 25 is mounted upon a suitable shaft arranged in proximity of the bed 1 and has arranged thereabout a sprocket chain 26, the opposite ends of which are connected to the bearings 15 and 16 of the beveled friction gears as at 27. As will be noted, the ends of the sprocket chain 25 are so engaged with the beveled gear bearings as to cause opposite movement of the friction gears, thus, varying their relative positions and permitting different driving relations to be obtained. It is to be understood, that a suitable handle, not shown, is arranged upon the sprocket wheel shaft in order that rotation of the same when shifting the transmission for the desired speed ratio will be facilitated.

Manifestly, the construction shown is capable of considerable modification and such modification as is within the scope of my claims, I consider within the spirit of my invention.

I claim:

1. In power transmitting apparatus, guide members, bed plates slidable in said guides, a driving shaft, a driven shaft, gears splined to the adjacent ends of said shaft and journaled in said slidable plates, and means connected with the plates for varying the relative position of the gears to establish different speed ratios.

2. In power transmission apparatus, guide members, bed plates slidable in said guides, standards, roller brackets on said standards and arranged adjacent said plates, laterally extending arms carried by the plates and slidably engaged with the roller brackets of said standards, a driving shaft, a driven shaft, interengaged beveled friction gears splined to the adjacent ends of said shafts, and housed by the bed plates and means connected with the plates for moving the same in opposite direction to vary the relation of the friction gears for establishing different speed ratios.

3. In power transmission apparatus, guide members, bed plates arranged at substantial right angles and slidable in said guides, a driving shaft, a driven shaft, bearings on said plates, interengaged beveled friction gears splined to the adjacent ends of said shafts and journaled in the bearings on the plates, said plates housing the friction gears and manually operable means connected with the plates for moving the same in opposite directions for varying the driving relations of the friction gears.

4. In power transmission apparatus, guide members, bed plates arranged at substantial right angles and slidable in said guides, standards, roller brackets on said standards arranged in proximity of said plates, laterally extending spaced pairs of arms carried by the plate and slidable on the roller brackets of said standards, a driving shaft, a driven shaft, interengaged beveled friction gears splined to the adjacent ends of said shafts, bearings on the slidable plates, said gears being journaled in the bearings, said plates housing the friction gears and manually operable means connected to the plate for moving the same in opposite directions to vary the relative driving relation of the friction gears.

In testimony whereof, I affix my signature hereto.

EDUARD C. BOHLMANN.

Copies of this patent may be obtained for five cents each, by addressing the "Commissioner of Patents, Washington, D. C."